(12) United States Patent
Brenninger et al.

(10) Patent No.: US 9,248,705 B2
(45) Date of Patent: Feb. 2, 2016

(54) ROTARY JOINT (75) Inventors: Martin Brenninger, Marktoberdorf (DE); Robert Heisler, Marktoberdorf (DE); Oliver Kreil, Kaltental (DE); Hans-Peter Zeiler, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 230 days.

(21) Appl. No.: 13/877,675

(22) PCT Filed: Sep. 2, 2011

(86) PCT No.: PCT/EP2011/065198
§ 371 (c)(1),
(2), (4) Date: Jul. 15, 2013

(87) PCT Pub. No.: WO2012/045533
PCT Pub. Date: Apr. 12, 2012

(65) Prior Publication Data
US 2013/0284281 A1    Oct. 31, 2013

(30) Foreign Application Priority Data

Oct. 4, 2010  (GB) .................................. 1016661.9
Oct. 4, 2010  (GB) .................................. 1016662.7

(51) Int. Cl.
*B60C 23/00*    (2006.01)
(52) U.S. Cl.
CPC ............... *B60C 23/00* (2013.01); *B60C 23/003* (2013.01); *Y10T 137/3584* (2015.04)
(58) Field of Classification Search
CPC ........................................................ B60C 23/00
USPC ................................................. 152/415–417
See application file for complete search history.

(56) References Cited

U.S. PATENT DOCUMENTS 5,253,688 A * 10/1993 Tigges ........................... 152/417
6,145,559 A * 11/2000 Ingram, II ..................... 152/417

(Continued)

FOREIGN PATENT DOCUMENTS

DE    102005006073 A1    8/2006
DE    102009037803 A1    8/2010

(Continued)

OTHER PUBLICATIONS

International Search Report for International Application No. PCT/EP2011/065198 Dated Nov. 15, 2011.

(Continued)

*Primary Examiner* — John Walters
*Assistant Examiner* — James Triggs (57) ABSTRACT

A tire inflation feed arrangement for a tire supported on a wheel carried by a wheel rim rotatably mounted via a wheel hub on an axially outer end of an axle housing. The feed arrangement has an annular support body surrounding the outer end of the axle housing, and three concentric annular seals extending around an axially outwardly facing surface on the support body to seal two concentric annular chambers formed in the axially outwardly facing surface between the seals. A first of these annular chambers is connectable with pressurized air to inflate the associated tire and the second annular chamber is connectable with pressurized air to operate a valve mounted on the wheel for admitting air into the tire from the first annular chamber or exhausting air from the tire. The annular seals are each mounted in a respective annular groove in the axially facing surface and each groove is also connectable with a source of pressurized air to press the seals against an annular contact surface on the wheel hub to seal the first and second annular chambers when the tire is being inflated. The wheel hub is provided with first receiving means which open through the annular contact surface to receive air from the first annular chamber and conduct such air to the tire and second receiving means which also opens through the annular contact surface to receive air from the second annular chamber and conduct such air to the valve mounted on the wheel. The support body is mounted on the axle housing in a location radially within bolts which attach the wheel to the hub to reduce the rubbing speed of the seals on the contact surface to reducing wear caused by the contact pressure of the seals.

10 Claims, 8 Drawing Sheets

(56) References Cited

U.S. PATENT DOCUMENTS

| | | | | |
|---|---|---|---|---|
| 8,910,683 B2 * | 12/2014 | Hennig | ......................... | 152/415 |
| 2013/0284281 A1 * | 10/2013 | Brenninger et al. | .......... | 137/223 |

FOREIGN PATENT DOCUMENTS

| | | | |
|---|---|---|---|
| EP | 1095799 | A1 | 5/2001 |
| EP | 1099574 | A1 | 5/2001 |
| GB | 2471478 | A | 1/2011 |
| WO | WO-2006/061479 | A1 | 6/2006 |

OTHER PUBLICATIONS

GB Search Report for GB Application No. GB1016662.7 Dated Jan. 21, 2011.

* cited by examiner

ROTARY JOINT

This invention relates to tyre inflation arrangements and in particular to such arrangements used on vehicles such as agricultural tractors or the like.

On such vehicles it is necessary, in order to improve efficiency and safety, to change tyre pressures depending on whether, for example, the tractor is operating in field conditions or on the road. When operating in the field lower pressures are required to reduce ground pressure and compaction and to improve grip whereas on the road higher pressures are required to reduce rolling resistance (to improve economy) and to reduce heat generation (to improve safety).

It is an object of the present invention to provide an improved form of tyre inflation feed arrangement which allows the efficient passage of air into the tyres and the release of air from the tyres when required and which is reliable in operation and economical to operate in terms of the wear of the air sealing arrangements used.

Thus according to the present invention there is provided a tyre inflation feed arrangement for a tyre supported on a wheel carried by a wheel rim rotatably mounted via a wheel hub on an axially outer end of an axle housing, the feed arrangement comprising a annular support body surrounding the outer end of the axle housing, three concentric annular seals extending around an axially outwardly facing surface on the support body to seal two concentric annular chambers formed in the axially outwardly facing surface between the seals, a first of said annular chambers being connectable with pressurised air to inflate the associated tyre and the second annular chamber being connectable with pressurised air to operate a valve mounted on the wheel for admitting air into the tyre from the first annular chamber or exhausting air from the tyre, the annular seals each being mounted in a respective annular groove in said axially facing surface and each groove also being connectable with a source of pressurised air to press said seals against an annular contact surface on the wheel hub to seal the first and second annular chambers when the tyre is being inflated, the wheel hub being provided with first receiving means which open through the annular contact surface to receive air from the first annular chamber and conduct such air to the tyre and second receiving means which also opens through the annular contact surface to receive air from the second annular chamber and conduct such air to the valve mounted on the wheel, the support body being mounted on the axle housing in a location radially within bolts which attach the wheel to the hub to reduce the rubbing speed of the seals on the contact surface to reducing wear caused by the contact pressure of the seals.

Because the support member is mounted on the axle housing in a location very close to the axis of rotation of the axle (for example well inboard of the wheel attachment bolts), the rubbing speed of the seals on the contact member is kept as low as possible thus further reducing wear caused by the contact pressure of the seals. The fact that the seals are only pressurised when air is actually being supplied to the tyre also reduces wear.

In accordance with a further aspect of the present invention, the annular contact surface may be provided by an annular contact member which is detachable secured to the wheel hub.

The use of the detachable annular contact member makes the arrangement particularly economical to use as the contact member can be easily replaced if it becomes worn due to contact by the seals thus avoiding the expensive replacement of the wheel hub.

Also, the contact member may be off non-corroding material to avoid wear in case of corrosion while the hub may be of a standard steel material. Thereby, only a smaller part must be made of the more expensive, non-corroding material.

In addition, the contact member may be of wear-resistant or non-corroding material or coated with such material like PTFE (Polytetrafluoroethylene) or nitrogen hardened.

The support body may be separate from the axle housing and have an axially extending flange which extends within the outer end of the axle housing. This flange may be sealed to the axle housing and to a drive shaft which supports the wheel hub within the casing.

Alternatively, the support body may be formed integrally with the axially out end of the axle housing.

A fourth annular seal may be provided radially outboard of the three concentric seals to prevent the ingress of foreign matter into the annual chambers. This fourth seal also contacts the contact member.

The contact member may also have a separate or integral annular toothed or apertured portion which cooperates with a Hall-Effect type or other type of sensor carried by the axle to provide a wheel speed signal.

The present invention will now be described, by way of example only, with reference to the accompanying drawings in which:—

Figure 1:
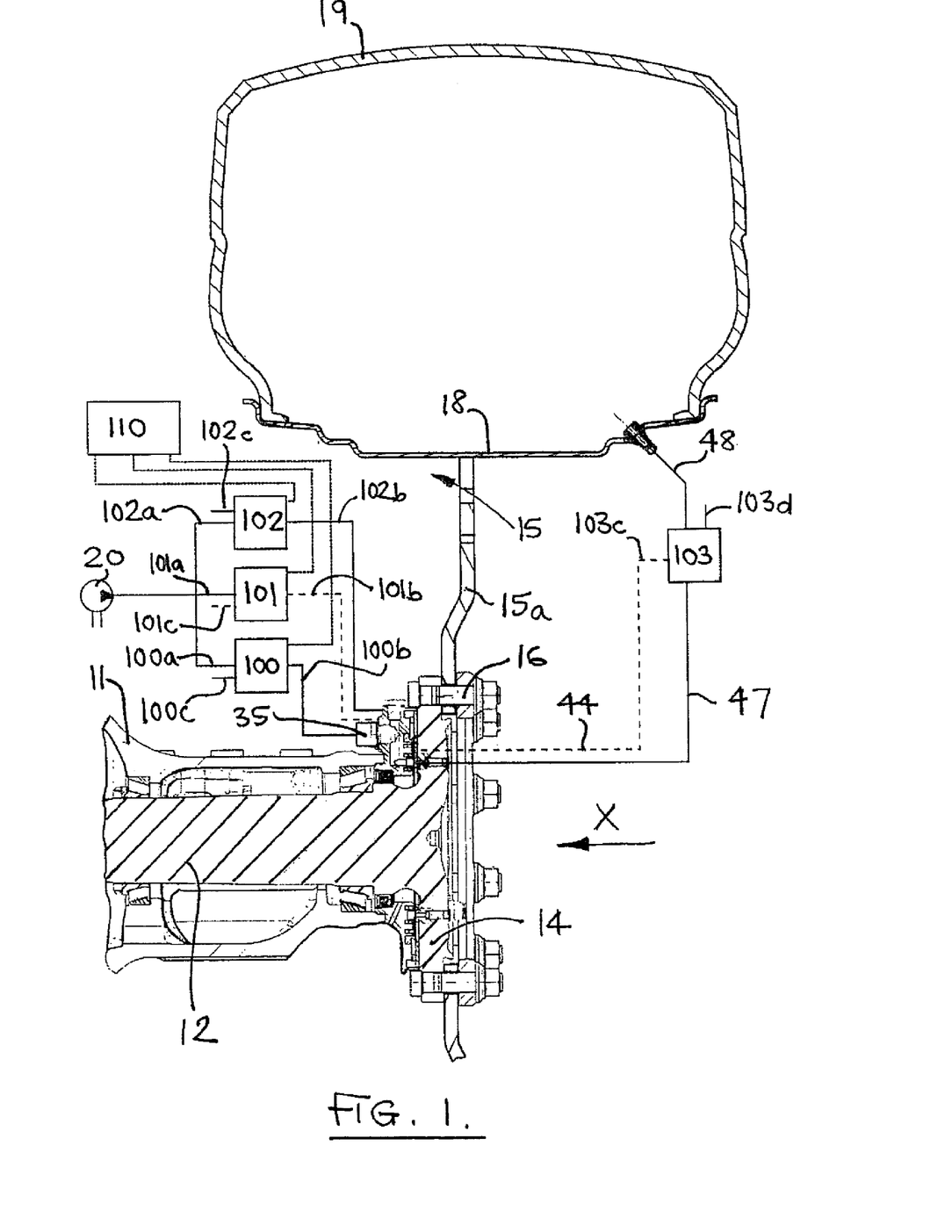
FIG. 1 shows an axial sectional view through half of a tractor rear axle fitted with a tyre inflation feed arrangement in accordance with the present invention.
Figure 2:
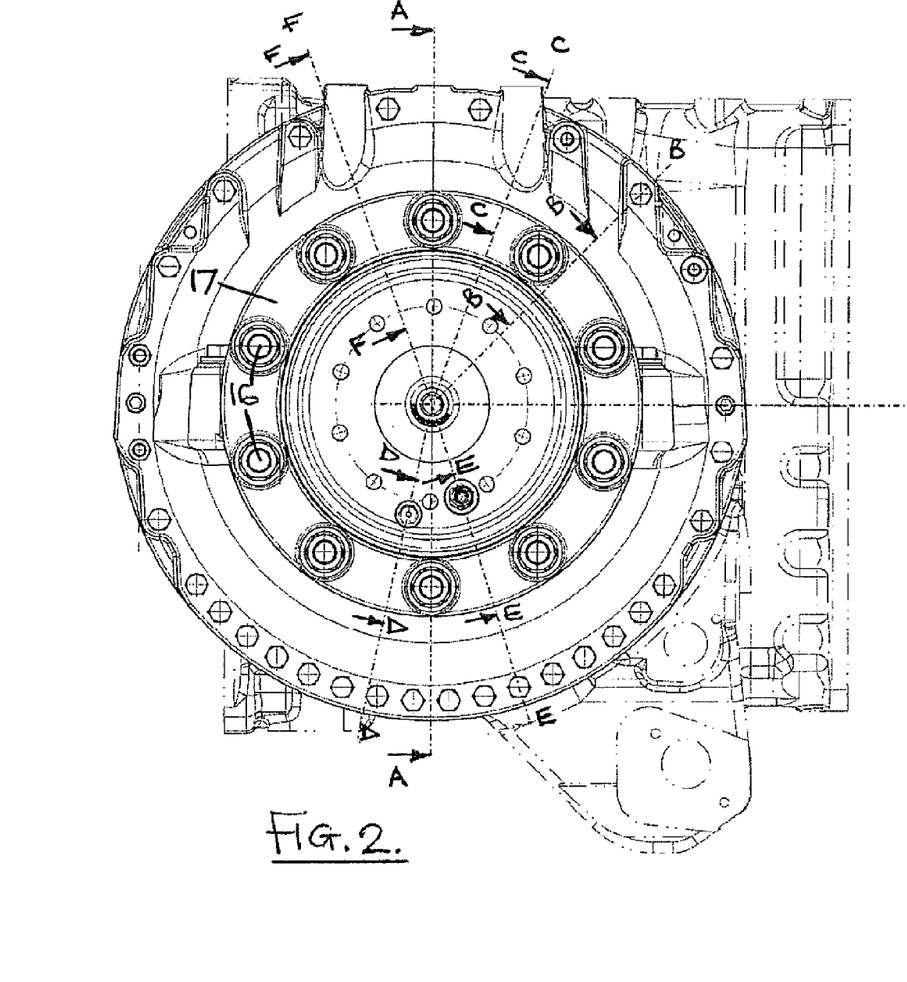
FIG. 2 shows an end view, in the direction of the arrow X of FIG. 1.
Figure 3:
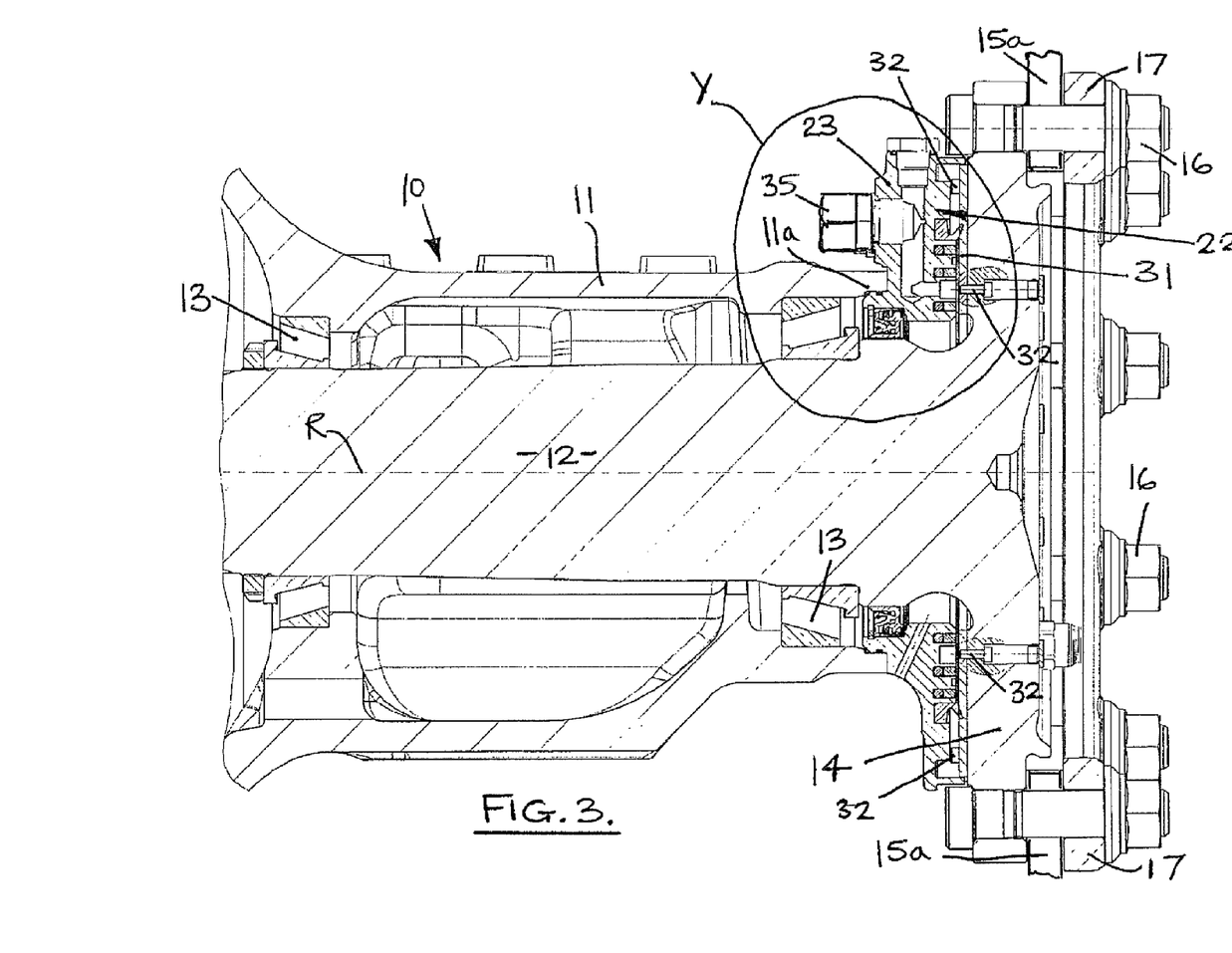
FIG. 3 shows a section on the line AA of FIG. 1.

Referring to the drawings, a tractor rear axle 10, half of which is shown in cross-section in FIG. 1 or 3, has an outer trumpet housing 11 within which a driveshaft 12 is supported by bearings 13. Driveshaft 12 terminates in a hub flange 14 to which a wheel disc 15a of a wheel 15 is clamped by bolts 16 and a clamping ring 17.

The wheel disc 15a carries a wheel rim 18 on which the pneumatic tyre 19 is mounted. The present invention is concerned with a tyre inflation feed arrangement 22 for conveying compressed air from a compressor 20 via air control valves 100, 101, 102 mounted on the tractor to the rotating wheel 15 and hence via an air control valve 103 mounted on the wheel to the interior of the tyre 19 via lines 47 and 48. Control valves 100, 101, 102 are solenoid control valves which are controlled by a control unit 110. These valves are 3/2 way control valves which open the air flow from intake lines 100a, 101a, 102a (connected to the compressor 20) to outlet lines 100b, 101b, 102b when activated by solenoid. When valves 100, 101 and 102 are not activated intake lines 100a, 101a, 102a is closed and the outlet lines 100b, 101b, 102b are connected to the ambient discharge lines 100c, 101c, 102c. Control valve 103 is a biased pressure controlled valve which opens the air flow from line 47 and thereby compressor 20 to line 48 and the interior of the tyre 19 when the control inlet 103c is charged with air via control line 44. In the non-activated condition of valve 103 line 47 is connected to the ambient discharge line 103d while the line 48 is blocked and line 47 is connected to the ambient discharge line 103d. Thereby, leakage in line 44, line 47 or the tyre inflation feed arrangement 22 would not cause unintentional deflation of the tyre.

Figure 5:
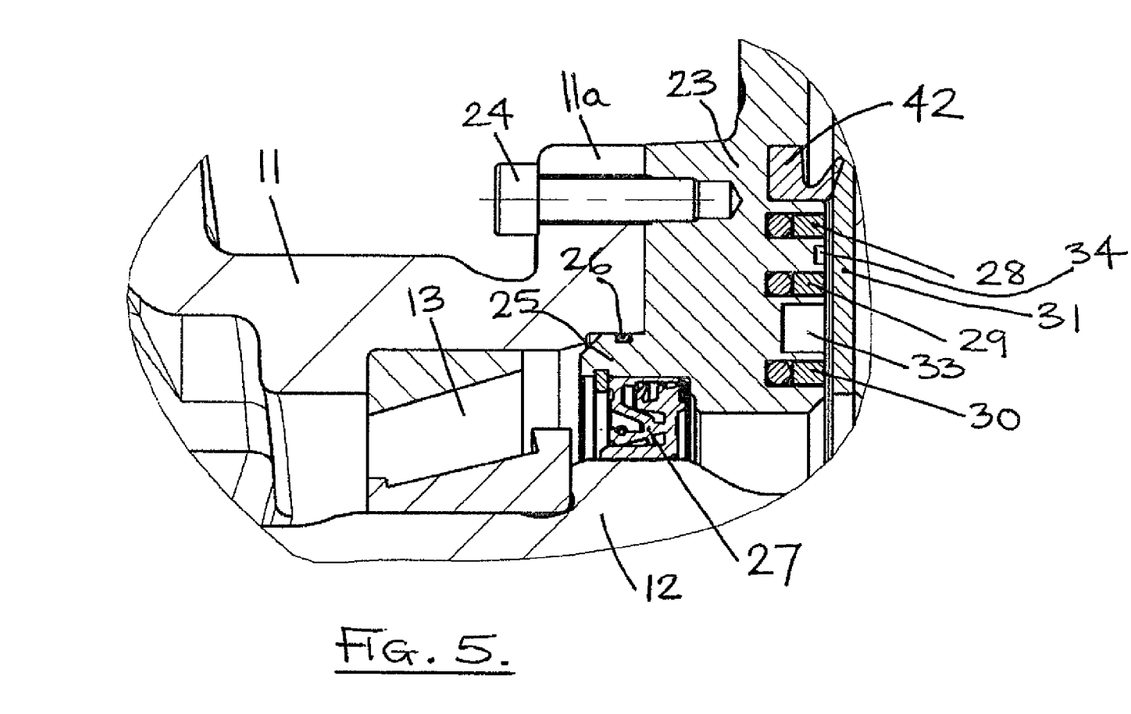
FIG. 5 shows a section on the line BB of FIG. 2.

The tyre inflation feed arrangement 22 comprises an annular support body 23 which is secured to the axially outer end 11a of the trumpet housing 11 by bolts 24 as best seen in FIG. 5. The annual support body 23 has an axially extending flange 25 which extends within the outer end 11a of the housing 11 and is sealed thereto by a seal 26. Flange 25 is also sealed to the shaft 12 by the main shaft seal 27 so that the bearings 13 are protected against the ingression of dirt and other foreign matter.

The support body 23 carries three concentric annular seal 28, 29 and 30 which, when in use, are arranged to seal against a contact surface provided on a contact member 31 made from stainless steel which is secured by fasteners 32 to the inside of the wheel flange 14. Seals 28, 29 and 30 seal two annular chambers 33 and 34 formed in the support body 23 via which air pressure can be transferred between the axle housing 11 and the rotating wheel 15. Alternatively the contact member may be coated with wear resistant material like PTFE (Polytetrafluoroethylene) or may be nitrogen hardened.

Figure 4:
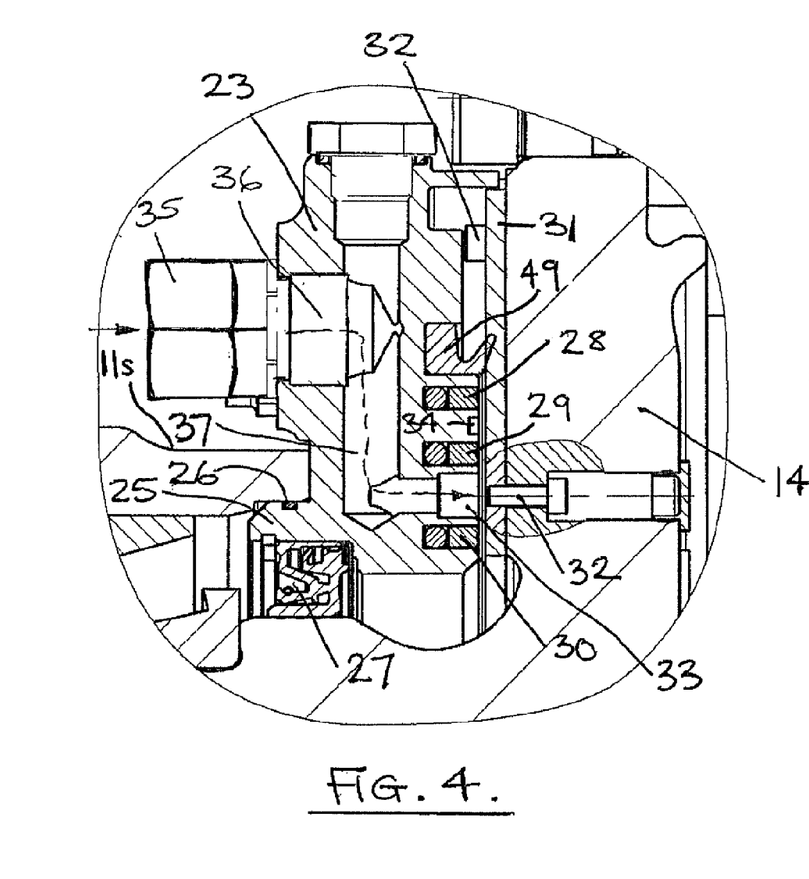
FIG. 4 shows an enlargement of the area Y of FIG. 3.
Figure 6:
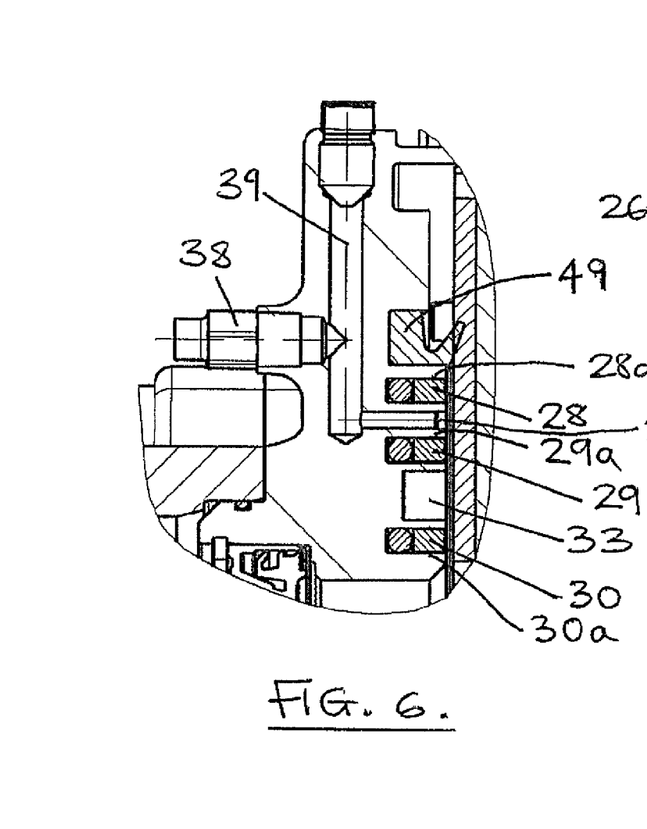
FIG. 6 shows a section on the line CC of FIG. 2.

As best seen in FIG. 4, the compressor 20 is connected with the annular chamber 33 via control valve 100 (shown in FIG. 1), connector 35 and passages 36 and 37. Similarly, the annular chamber 34 is connected with a source of air pressure via control valve 101 (shown in FIG. 1), a connector 38 and passage 39 (see FIG. 6).

Figure 9:
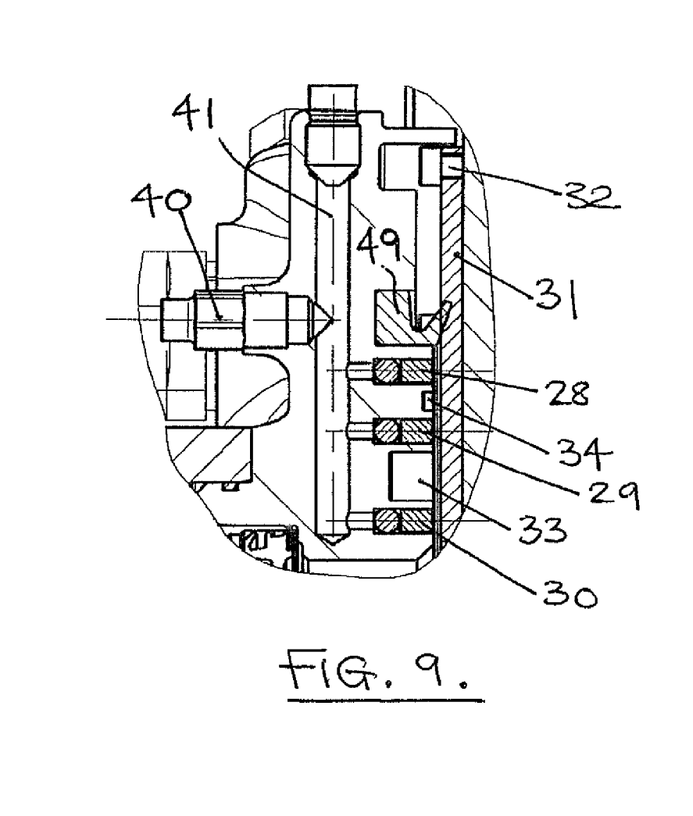
FIG. 9 shows a section on the line FF of FIG. 2.

Each seal 28, 29 and 30 is mounted in a respective sealing groove 28a, 29a and 30a. These sealing grooves are also connected with a source of air pressure via control valve 102 (shown in FIG. 1), a connector 40 and passage 41 (see FIG. 9).

The ingression of dirt and other foreign matter into the area of seals 28, 29 and 30 is prevented by an outer seal 49 carried by the support body 23.

Figure 8:
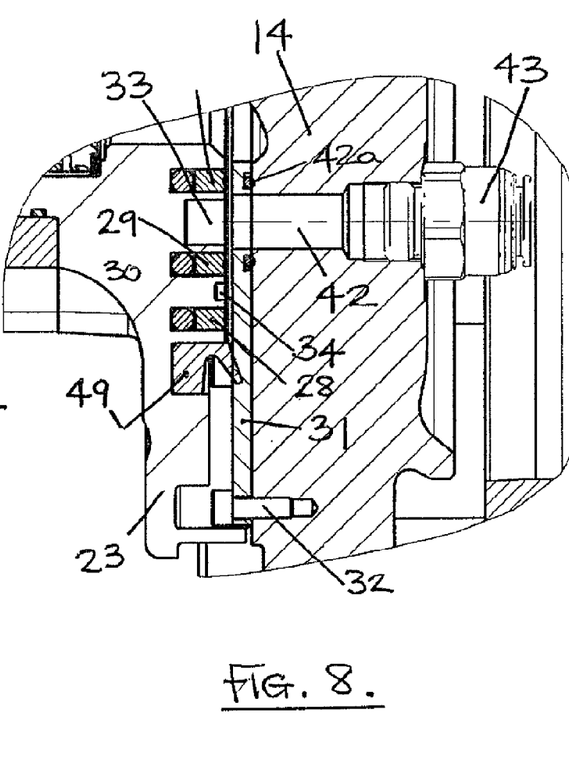
FIG. 8 shows a section on the line EE of FIG. 2.

Air from annular chamber 33 is transmitted between seals 29 and 30 into a passage 42 provided in wheel hub flange 14 enhanced by a further connector 43 (see FIG. 8) to supply line 47 which is connected with air control valve 103. Seal 42a surrounds passage 42 to prevent the escape of air from passage 42 between the contact member 31 and flange 14.

Figure 7:
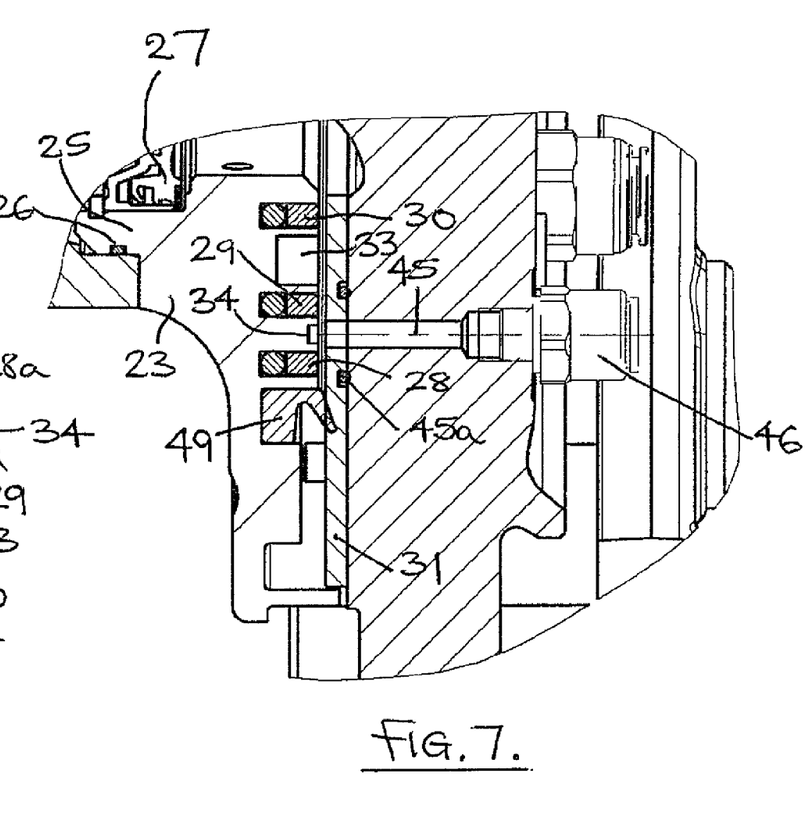
FIG. 7 shows a section on the line DD of FIG. 2.

Similarly, air from annular chamber 34 between seals 28 and 29 is transmitted via a passage 45 in hub flange 14 (see FIG. 7) and hence to a connector 46 which is also connected with air control valve 21 via a control line 44. Seal 45a surrounds passage 45 to prevent the escape of air from passage 45 between the contact member 31 and flange 14.

The above described tyre inflation feed arrangement 22 operates as follows.

The tyre inflation feed arrangement 22 can only conduct air from tractor to wheel 15 when the seals 28, 29 and 30 are in sealing contact with contact member 31.

So, whenever air is supplied to control valve 103, either via valve 100 to supply line 47 or via valve 101 to control line 44 so that air has to pass through the tyre inflation feed arrangement 22, the sealing grooves 28a, 29a and 30a of the seals 28, 29 and 30 are pressurised to push them towards the contact member 31 to ensure that the chambers 33 and 34 remain air tight. Therefore control valve 102 opens the air flow from the intake line 102a (connected to the compressor 20) to the outlet line 102b (connected to connector 40 and passage 41) to pressurise sealing grooves 28a, 29a and 30a.

Whenever air supply to control valve 103 via line 47 or 44 and passage of air through the tyre inflation feed arrangement 22 is not needed, control valve 102 is deactivated so that intake line 102a is closed and outlet line 102b is connected to ambient discharge line 102c to enable the seals 28, 29 and 30 to move away from the contact member 31 to reduce wear.

To increase the air pressure in the tyre 19 control valve 100 is opened so that air from the compressor 20 is supplied to control valve 103 via connection 35 passages 36, 37 chamber 33, passage 42, connector 43 and supply line 47. At the same time, the control inlet 103c of control valve 103 is charged with air via control line 44, so that the passage to line 48 and the interior of the tyre 19 is open. Thereby, pressure in the tyre 19 is increased.

If it is desired to release some air pressure from within the tyre the control inlet 103c of control valve 103 is charged with air via control line 44, so that supply line 47 and control valve 100 are connected to the line 48 and hence the interior of the tyre 19. As at the same time, valve 100 is switched into a position so that the outlet 100b is connected to the ambient discharge 100c, the interior of the tyre is connected to the ambient environment so the tyre pressure inside the tyre 19 is decreased.

By providing the detachably mounted contact member 31 on the wheel hub flange 14 against which the seals 28, 29 and 30 make contact, the tyre inflation feed arrangement of the present invention enables the effects of any wear caused by the contact pressure from the seals 28, 29 and 30 to be minimised since, should such wear occur, the contact member 31 can be relatively easily replaced without the need for replacement of the expensive wheel flange 14 and associated shaft 12.

Because the support member is mounted on the axle housing 11 in a location very close to the axis of rotation R of the axle, for example well within the wheel attachment bolts 16, the rubbing speed of the seals 28, 29 and 30 on the contact member 31 is kept as low as possible thus further reducing wear. In the example described above (see FIG. 5) the seals 29 and 30 lie radially inboard of the outer surface 11s of the trumpet housing 11.

Figure 10:
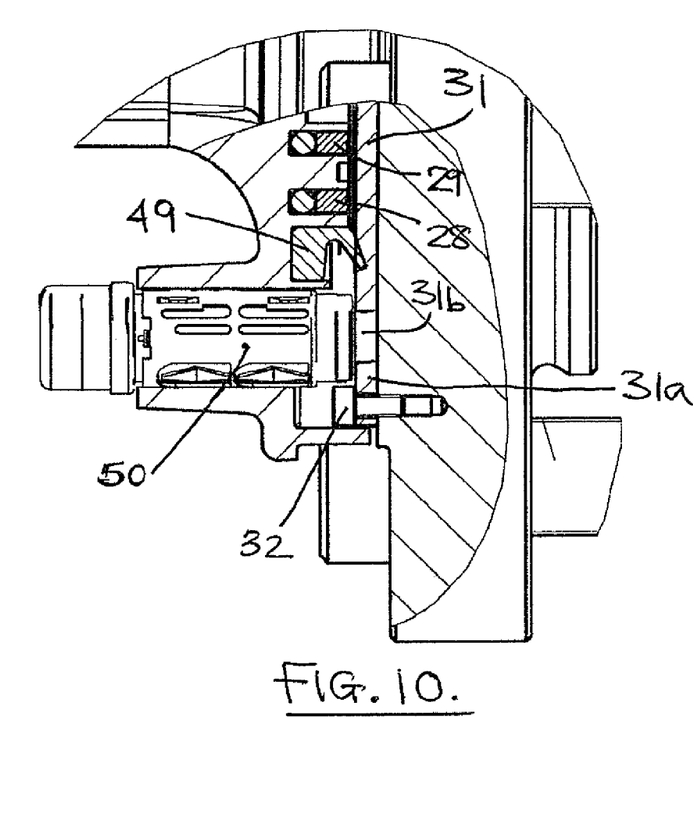
FIG. 10 shows a section on the line GG of FIG. 2 of a speed sensor arrangement.
Figure 11:
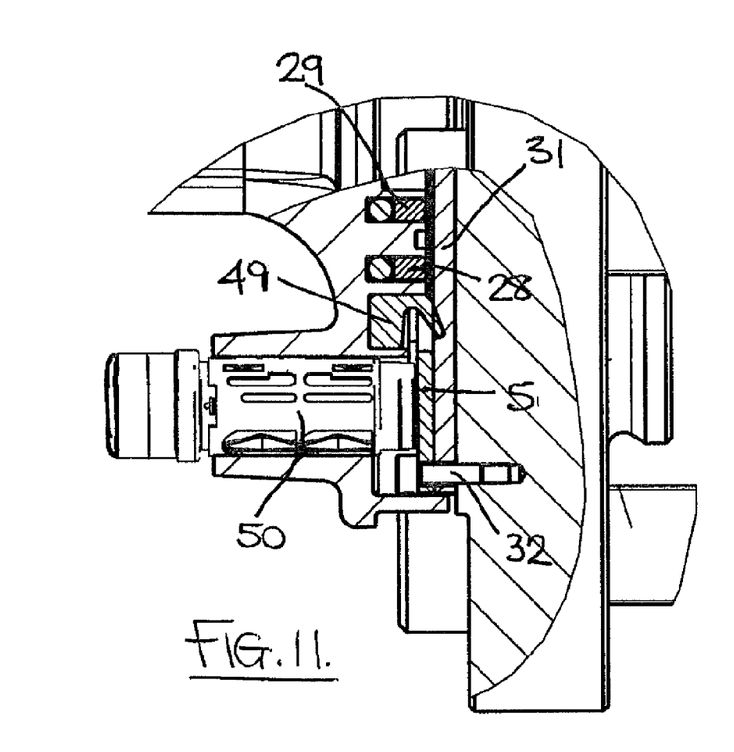
FIG. 11 shows an alternative speed sensor arrangement.

As shown in FIG. 10, the radially outer portion of contact member 31 may be provided with circumferentially spaced apertures 31b which rotate past a Hall Effect sensor 50 to provide a signal indicative of the speed of rotation of the associated wheel. If preferred for manufacturing reason or convenience, a separate annular disc 51 with circumferentially spaced teeth or other apertures can be fastened on top of contact member 31 opposite sensor 49 as shown in FIG. 11.

Figure 12:
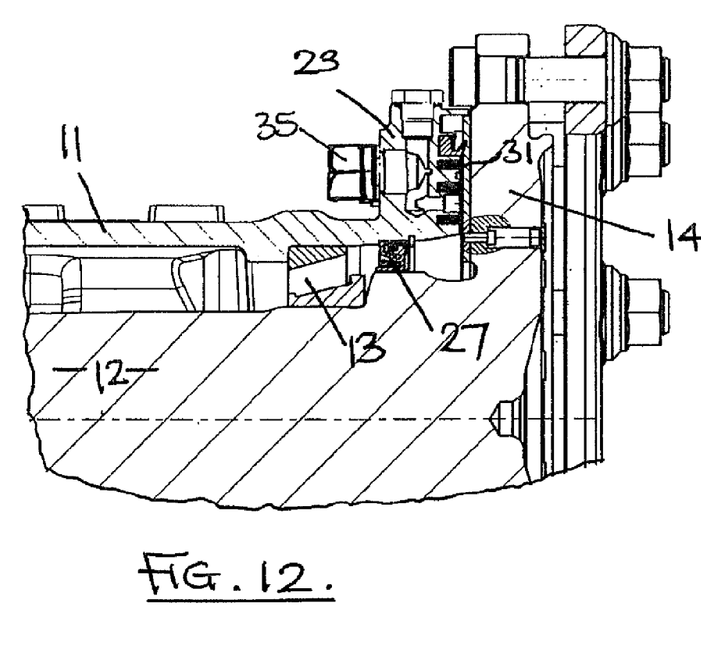
FIG. 12 shows the support body of the of the tyre inflation arrangement formed integrally with the axle housing.

As a further alternative, the support body 23 could be formed integrally with the outer end 11a of axle housing 11 as shown in FIG. 12 so that the requirement for seal 26 is eliminated and the number of parts is reduced.

The invention claimed is:

1. A tyre inflation feed arrangement for a tyre supported on a wheel carried by a wheel rim rotatably mounted via a wheel hub on an axially outer end of an axle housing, the feed arrangement comprising a annular support body surrounding the outer end of the axle housing, three concentric annular seals extending around an axially outwardly facing surface on the support body to seal two concentric annular chambers formed in the axially outwardly facing surface between the seals, a first of said annular chambers being connectable with pressurised air to inflate the associated tyre and the second annular chamber being connectable with pressurised air to operate a valve mounted on the wheel for admitting air into the tyre from the first annular chamber or exhausting air from the tyre, the annular seals each being mounted in a respective annular groove in said axially facing surface and each groove also being connectable with a source of pressurised air to press said seals against an annular contact surface on the wheel hub to seal the first and second annular chambers when the tyre is being inflated, the wheel hub being provided with a first passage which opens through the annular contact surface to receive air from the first annular chamber and conduct such air to the tyre and a second passage which also opens through the annular contact surface to receive air from the second annular chamber and conduct such air to the valve mounted on the wheel, the support body being mounted on the axle housing in a location radially within bolts which attach the wheel to the hub to reduce the rubbing speed of the seals on the contact surface to reducing wear caused by the contact pressure of the seals.

2. The arrangement of claim 1 in which the annular contact surface is provided by an annular contact member which is detachable secured to the wheel hub.

3. The arrangement of claim 1 or 2 in which the support body is separate from the axle housing and has an axially extending flange which extends within the outer end of the axle housing.

4. The arrangement of claim 3 in which the support body is sealed to the axle housing and to a drive shaft which supports the wheel hub within the housing.

5. The arrangement of claim 1 in which the support body is formed integrally with the axially out end of the axle housing.

6. The arrangement of claim 1 in which a fourth annular seal is provided radially outboard of the three concentric seals to prevent the ingress of foreign matter into the annual chambers.

7. The arrangement of claim 6 in which the fourth seal also contacts the contact surface.

8. The arrangement of claim 1 in which the contact surface is made from stainless steel or coated with PTFE or is nitrogen hardened.

9. The arrangement of claim 1 in which the contact surface has a separate or integral annular toothed or apertured portion which cooperates with a Hall-Effect sensor carried by the axle to provide a wheel speed signal.

10. A tyre inflation feed arrangement for a tyre supported on a wheel carried by a wheel rim rotatably mounted via a wheel hub on an axially outer end of an axle housing, the feed arrangement comprising a annular support body surrounding the outer end of the axle housing, three concentric annular seals extending around an axially outwardly facing surface on the support body to seal two concentric annular chambers formed in the axially outwardly facing surface between the seals, a first of said annular chambers being connectable with pressurised air to inflate the associated tyre and the second annular chamber being connectable with pressurised air to operate a valve mounted on the wheel for admitting air into the tyre from the first annular chamber or exhausting air from the tyre, the annular seals each being mounted in a respective annular groove in said axially facing surface and each groove also being connectable with a source of pressurised air to press said seals against an annular contact surface on the wheel hub to seal the first and second annular chambers when the tyre is being inflated, the wheel hub being provided with a first passage which opens through the annular contact surface to receive air from the first annular chamber and conduct such air to the tyre and a second passage which also opens through the annular contact surface to receive air from the second annular chamber and conduct such air to the valve mounted on the wheel, the annular contact surface being provided by an annular contact member which is detachable secured to the wheel hub.

* * * * *